United States Patent
Liu et al.

(10) Patent No.: US 10,511,414 B2
(45) Date of Patent: Dec. 17, 2019

(54) HARQ ACK/NACK BUNDLING IN DOWNLINK CARRIER AGGREGATION

(71) Applicant: Telefonaktiebolaget LM Ericsson (publ), Stockholm (SE)

(72) Inventors: Jinhua Liu, Beijing (CN); Daniel Larsson, Stockholm (SE); Shaohua Li, Beijing (CN); Xinghua Song, Beijing (CN); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 15/544,360

(22) PCT Filed: Jan. 29, 2016

(86) PCT No.: PCT/SE2016/050060
§ 371 (c)(1),
(2) Date: Jul. 18, 2017

(87) PCT Pub. No.: WO2016/122390
PCT Pub. Date: Aug. 4, 2016

(65) Prior Publication Data
US 2018/0013522 A1 Jan. 11, 2018

(30) Foreign Application Priority Data
Jan. 30, 2015 (WO) ................ PCT/CN2015/000073

(51) Int. Cl.
*H04L 1/18* (2006.01)
*H04L 1/16* (2006.01)
*H04L 5/00* (2006.01)

(52) U.S. Cl.
CPC .......... *H04L 1/1861* (2013.01); *H04L 1/1607* (2013.01); *H04L 1/1854* (2013.01); *H04L 5/0055* (2013.01); *H04L 5/001* (2013.01); *H04L 5/0046* (2013.01)

(58) Field of Classification Search
CPC ... H04L 1/1861; H04L 5/0055; H04L 1/1607; H04L 1/1854; H04L 5/0046; H04L 5/001
See application file for complete search history.

(56) References Cited

U.S. PATENT DOCUMENTS

| | | | | |
|---|---|---|---|---|
| 9,049,704 B2* | 6/2015 | Yang | | H04L 1/1861 |
| 9,072,056 B2* | 6/2015 | Suzuki | | H04L 5/001 |
| 9,148,262 B2* | 9/2015 | Yang | | H04W 72/14 |
| 9,191,171 B2* | 11/2015 | Nakao | | H04L 1/0027 |
| 9,386,565 B2* | 7/2016 | Yang | | H04L 1/1861 |
| 9,401,779 B2* | 7/2016 | Kwon | | H04L 1/1614 |
| 9,559,813 B2* | 1/2017 | Yang | | H04L 1/1861 |

(Continued)

OTHER PUBLICATIONS

European Office Action dated Jan. 31, 2019 for European Patent Application No. 16704490.8, 4 pages.

Primary Examiner — Mounir Moutaoakil
(74) Attorney, Agent, or Firm — Sage Patent Group

(57) ABSTRACT

There are described methods, devices and systems for bundling of HARQ feedback for a carrier aggregation. Bundling is performed based on one of: Frequency domain bundling; Differentiated bundling for different frequency bands (e.g. differentiated bundling for licensed and unlicensed carriers); differentiated bundling for primary carrier and secondary carriers; and DL CC group specific bundling configuration.

16 Claims, 4 Drawing Sheets

(56) References Cited

U.S. PATENT DOCUMENTS

| | | | |
|---|---|---|---|
| 9,826,517 B2 * | 11/2017 | Chen | H04L 1/1854 |
| 9,860,026 B2 * | 1/2018 | Guo | H04L 1/1812 |
| 2011/0141878 A1 | 6/2011 | Che et al. | |
| 2011/0151878 A1 | 6/2011 | Che | |
| 2011/0243079 A1 * | 10/2011 | Chen | H04B 7/063 |
| | | | 370/329 |
| 2012/0057487 A1 | 3/2012 | Ahn | |
| 2012/0106569 A1 | 5/2012 | Che | |
| 2012/0294256 A1 | 11/2012 | Yoshida | |
| 2012/0314675 A1 * | 12/2012 | Vujcic | H04L 5/001 |
| | | | 370/329 |
| 2013/0322358 A1 * | 12/2013 | He | H04W 72/0406 |
| | | | 370/329 |
| 2014/0036856 A1 * | 2/2014 | Park | H04L 1/1671 |
| | | | 370/329 |
| 2014/0092824 A1 * | 4/2014 | He | H04W 4/70 |
| | | | 370/329 |
| 2014/0133411 A1 * | 5/2014 | Park | H04L 5/0058 |
| | | | 370/329 |
| 2014/0146733 A1 | 5/2014 | Nakao | |
| 2014/0226608 A1 * | 8/2014 | Seo | H04L 1/0041 |
| | | | 370/329 |
| 2014/0369294 A1 * | 12/2014 | Seo | H04W 76/10 |
| | | | 370/329 |
| 2016/0330010 A1 * | 11/2016 | Qin | H04L 5/0058 |

* cited by examiner

HARQ ACK/NACK BUNDLING IN DOWNLINK CARRIER AGGREGATION

TECHNICAL FIELD

The present disclosure pertains to the field of wireless communication technology, in particular to carrier aggregation scenarios.

BACKGROUND

Carrier aggregation (CA) is introduced widely into wireless communication systems to increase system capacity and peak data rates. With CA, several carriers can be bundled (aggregated) together for UL or DL (or UL and DL) transmission, increasing the available bandwidth. Carrier aggregations may benefit from new concepts of control signaling, as commonly used concepts usually deal with a low number of carriers being utilised.

SUMMARY

It is an object of the present disclosure to present concepts for control signaling, in particular HARQ-related signaling, for carrier aggregation scenarios, in particular scenarios with a large (5 or more) number of aggregated carriers.

Accordingly, there is disclosed a method for operating a terminal in a wireless communication network. The terminal is connected to the network via a communication link having a DL carrier aggregation comprising at least two carriers. The method comprises bundling HARQ feedback for a plurality of carriers of the DL carrier aggregation.

Moreover, there is disclosed a terminal for a wireless or cellular communication network. The terminal is adapted to perform one of the methods for operating a terminal disclosed herein. Alternatively or additionally, the terminal is adapted to perform bundling of HARQ feedback for a plurality of carriers of a DL carrier aggregation.

In addition, a method for operating a network node of a wireless or cellular communication network is described. The method comprises configuring, by the network node, a terminal to perform HARQ ACK/NACK bundling, in particular as described herein.

Furthermore, a network node for a wireless or cellular communication network is proposed. The network node is adapted to perform any of the methods for operating a network node described herein and/or to configure a terminal to perform HARQ ACK/NACK bundling, in particular as described herein.

Alternatively or additionally to the terminal mentioned before, a terminal for a wireless or cellular communication network is suggested, the terminal comprising a connection module for connection to the network via a communication link having a DL carrier aggregation comprising at least two carriers, the terminal further comprising a bundling module for bundling HARQ feedback for a plurality of carriers of the DL carrier aggregation.

A network node for a wireless or cellular communication network is considered, in particular a network node as described herein. The network node comprises a configuring module for configuring a terminal to perform HARQ ACK/NACK bundling, in particular as described herein.

There is also described a system for a wireless communication network comprising a network node as described herein and/or a terminal as described herein.

Moreover, a computer program product is disclosed, the computer program product comprising code elements causing performing of any of the methods described herein when executed on control circuitry.

There may also be considered a storage medium or carrier medium storing and/or carrying a computer program product as described herein.

By bundling HARQ feedback, the signaling overhead may be limited in particular in scenarios with large numbers of carrier and/or HARQ processes in the carrier aggregation. Also, bundling may allow more reliable transmission of HARQ feedback in particular in a scenario in which includes unlicensed carriers (respectively, carriers that need a listen-before talk procedure before being accessible for transmission. In particular, HARQ feedback may be bundled to be transmitted on a licensed carrier.

BRIEF DESCRIPTION OF THE DRAWINGS

The drawings are provided to illustrate concepts and approaches of the disclosure and are not intended as limitation. The drawings comprise.

DETAILED DESCRIPTION

Figure 1:
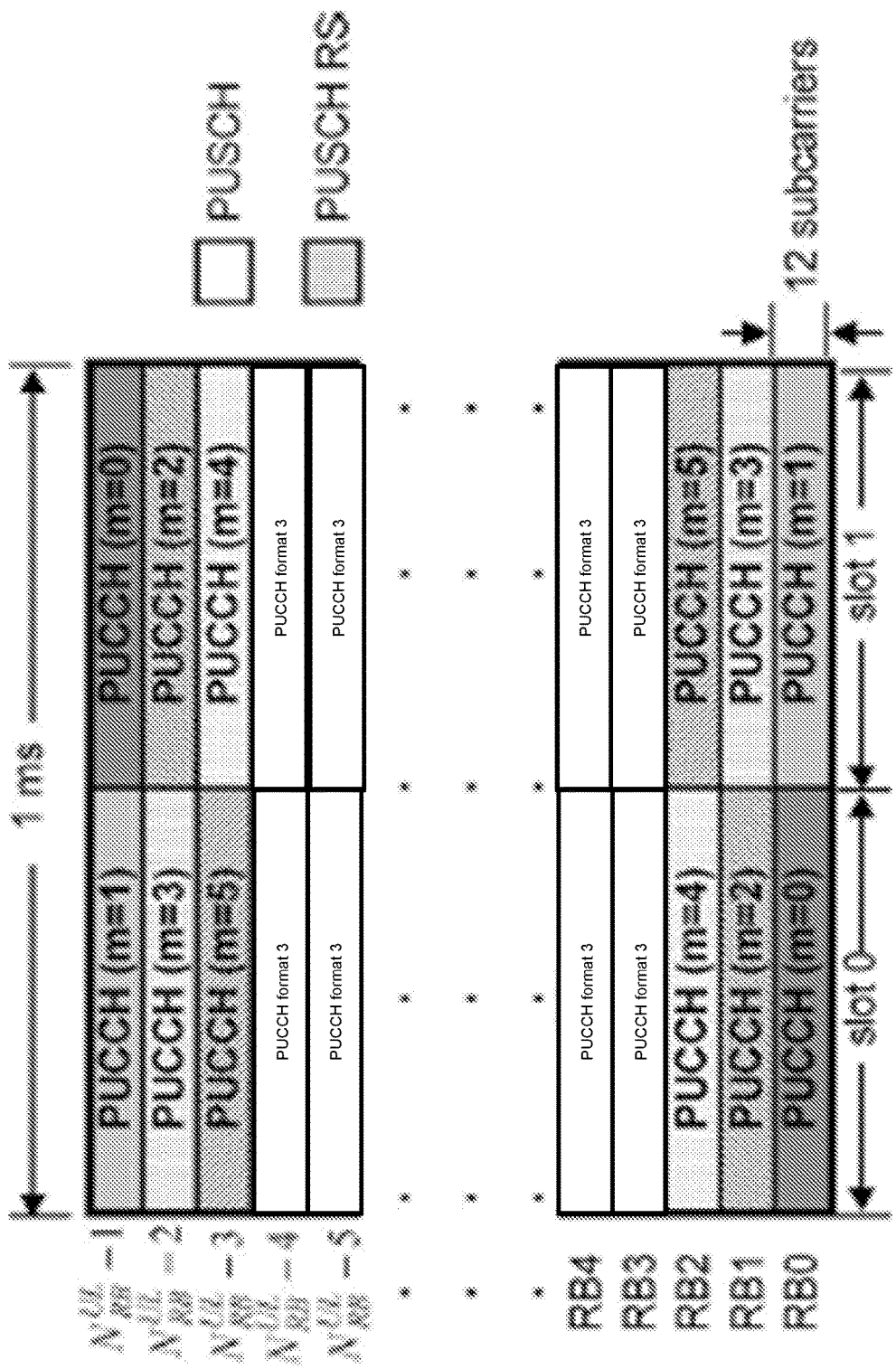
FIG. 1 showing a PUCCH uplink control structure with 6 PRBs.

In the following, the terms "terminal" and "user equipment" (UE) may be interchanged. A base station or eNodeB may be seen as examples of a network node or control node.

Aspects of carrier aggregation are described in the following.

The use of LTE carrier aggregation (CA), introduced in Rel-10 and enhanced in Rel-11, offers means to increase the peak data rates, system capacity and user experience by aggregating radio resources from multiple carriers that may reside in the same band or different bands and, for the case of inter-band TDD CA, may be configured with different UL/DL configurations. In Rel-12, carrier aggregation between TDD and FDD serving cells is introduced to support UE connecting to them simultaneously.

A carrier may generally be defined by a radio frequency and/or a bandwidth; it may be considered that a carrier has one or more subcarriers.

Generally, carrier aggregation (CA) may refer to the concept of a radio connection and/or communication link between a wireless and/or cellular communication network and/or network node and a terminal comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. called primary component carrier or PCC), over which control information may be transmitted, wherein the control information may refer to the primary carrier and other carriers, which may be referred to as secondary carriers (or secondary component carrier, SCC).

Control information may comprise scheduling information and/or allocation data and/or HARQ signaling, in particular in regards to a DL connection. A communication link may comprise an UL connection and/or a DL connection. It may be considered that a communication link comprise different carriers and/or carrier aggregations for UL and/or DL; in particular, it may be considered that a communication link comprises one or more carriers and/or carrier aggregations for DL and a different number of carriers and/or carrier aggregations for UL, which may use different frequencies than the DL carriers.

Carriers in a carrier aggregation may comprise carrier/s in a licensed spectrum and/or carrier/s in an unlicensed spectrum. In particular, carrier/s of an unlicensed spectrum may be secondary carriers of a carrier aggregation. It may be considered that primary carriers are in a licensed spectrum. Generally, before accessing a carrier in an unlicensed spectrum for transmission, a listen-before-talk (LBT) procedure may be performed, e.g. by a correspondingly adapted terminal or network node. Carriers of a carrier aggregation may belong to different frequency bands, e.g. as defined in a given standard as LTE and/or in terms of frequency and/or spectral width, and/or whether they are licensed or not. Different carriers may be associated to different frequency bands; it may be considered that different frequency bands have different carriers (one or more than one carrier per frequency band may generally be envisaged) associated to them. Licensed bands or spectra may have different frequency bands than unlicensed bands or spectra. A control carrier may be a primary carrier used for control information transmission, e.g. for the transmission of HARQ feedback and/or for CSI information and/or scheduling requests. Generally, a DL carrier aggregation may comprise more than 2, more particular more than 5, in particular between 6 and 32 carriers.

In Rel-13, LAA (Licensed-Assisted Access) has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac.

There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the carrier aggregation framework to support more than 5 carriers. The extension of the CA framework beyond 5 carriers was approved to be one work item for LTE Rel-13. The objective is to support an increased number of carriers in a carrier aggregation, in particular up to 32 carriers in both UL and DL.

Compared to single-carrier operation, a UE operating with CA has to report feedback for more than one DL component carriers. Meanwhile, a UE does not need to support DL and UL CA simultaneously. For instance, the first release of CA capable UEs in the market only supports DL CA but not UL CA. This is also the underlying assumption in the 3GPP RAN4 standardization. Therefore, an enhanced UL control channel, i.e. PUCCH format 3 was introduced for CA during Rel-10 timeframe. However, in order to support more component carriers in Rel-13, the UL control channel capacity becomes a limitation.

PUCCH Format introduction is discussed in the following.

UCI (Uplink Control Information), which may be carried over PUCCH and/or a primary component carrier, may be used to carry the HARQ-ACK/NACK (Hybrid Automatic Repeat Request, CSI (Channel State Information) and/or SR for a UE (User Equipment, a form of terminal). It may be transmitted using side PRBs in uplink.

FIG. 1 illustrates a non-Format 3 PUCCH with 6 PRBs and a Format 3 PUCCH with 4 PRBs, 3 and 2 PRBs in each side respectively. One PUCCH is transmitted over one PRB; in order to improve the diversity with PUCCH over only one PRB, the first half PRB is put one side and the second half PRB is put the opposite side.

UCI has a lot of formats, Format 1, 1a/b, 2, 2a/b and 3 for different purposes. Within these formats, PUCCH format 3 is designed to convey large ACK/NACK payloads in case of carrier aggregation with up to 5 CCs. PUCCH Format 3 is not based on Zadoff-Chu sequences and is more similar to PUSCH transmissions. Orthogonal cover sequence may be applied to the SC-FDMA symbols used for ACK/NACK data: these sequences are DFT sequences of length 5, allowing multiplexing of up to 5 Format 3 transmissions in the same RB. PUCCH Format 3 supports transmission of 48 coded bits. The actual number of bits of ACK/NACK feedback is determined by the number of configured CCs, the configured transmission modes on each of them, and, in TDD, the ACK/NACK bundling window size.

For FDD, a maximum payload of 10 ACK/NACK bits is supported, covering up to five CCs configured for MIMO transmission (i.e. two ACK/NACK bits per CC). For TDD, PUCCH Format 3 supports an ACK/NACK payload size of up to 20 bits. The PUCCH resource to be used for Format 3 is signaled explicitly to the UE. A set of four resources is configured by RRC signaling, of which one resource is then indicated dynamically for each ACK/NACK occasion using an indicator transmitted in the Transmitter Power Control (TPC) field of the PDCCH corresponding to PDSCH on the SCCs. All SCC PDCCH assignments in a given subframe indicate the same value. If transmit diversity is used for PUCCH Format 3 (see Section 29.4.2), the RRC signaling configures four pairs of PUCCH resources, and the PDCCH assigning resources for the SCC PDSCH indicates one of these pairs to be used by the two antenna ports.

HARQ and/or CSI feedback over UL SCH data is discussed in the following.

When UCI (in particular, HARQ signaling) is to be transmitted in a subframe in which the UE has been allocated transmission resources for the PUSCH, the UCI may be multiplexed together with UL-SCH data prior to DFT spreading, in order to preserve the low CM single-carrier property; the PUCCH is never transmitted in the same subframe as the PUSCH in LTE Releases 8 and 9. The multiplexing of feedback information like CQI/PMI, HARQ ACK/NACK, and RI with the PUSCH data symbols onto uplink resource elements (REs) is shown in Figure.

The number of REs used for ACK/NACK is based on the MCS assigned for which is semi-statically configured by higher-layer signaling. The HARQ ACK/NACK resources are mapped to SC-FDMA symbols by puncturing the UL-SCH PUSCH data. Positions next to the RS are used, so as to benefit from the best possible channel estimation. The maximum amount of resource for HARQ ACK/NACK is 4 SC-FDMA symbols. The coded RI symbols are placed next to the HARQ ACK/NACK symbol positions irrespective of whether ACK/NACK is actually present in a given subframe. The modulation of the 1- or 2-bit ACK/NACK or RI is such that the Euclidean distance of the modulation symbols carrying ACK/NACK and RI is maximized. The outermost constellation points of the higher-order 16/64-QAM PUSCH modulations are used, resulting in increased transmit power for ACK/NACK/RI relative to the average PUSCH data power.

Figure 2:
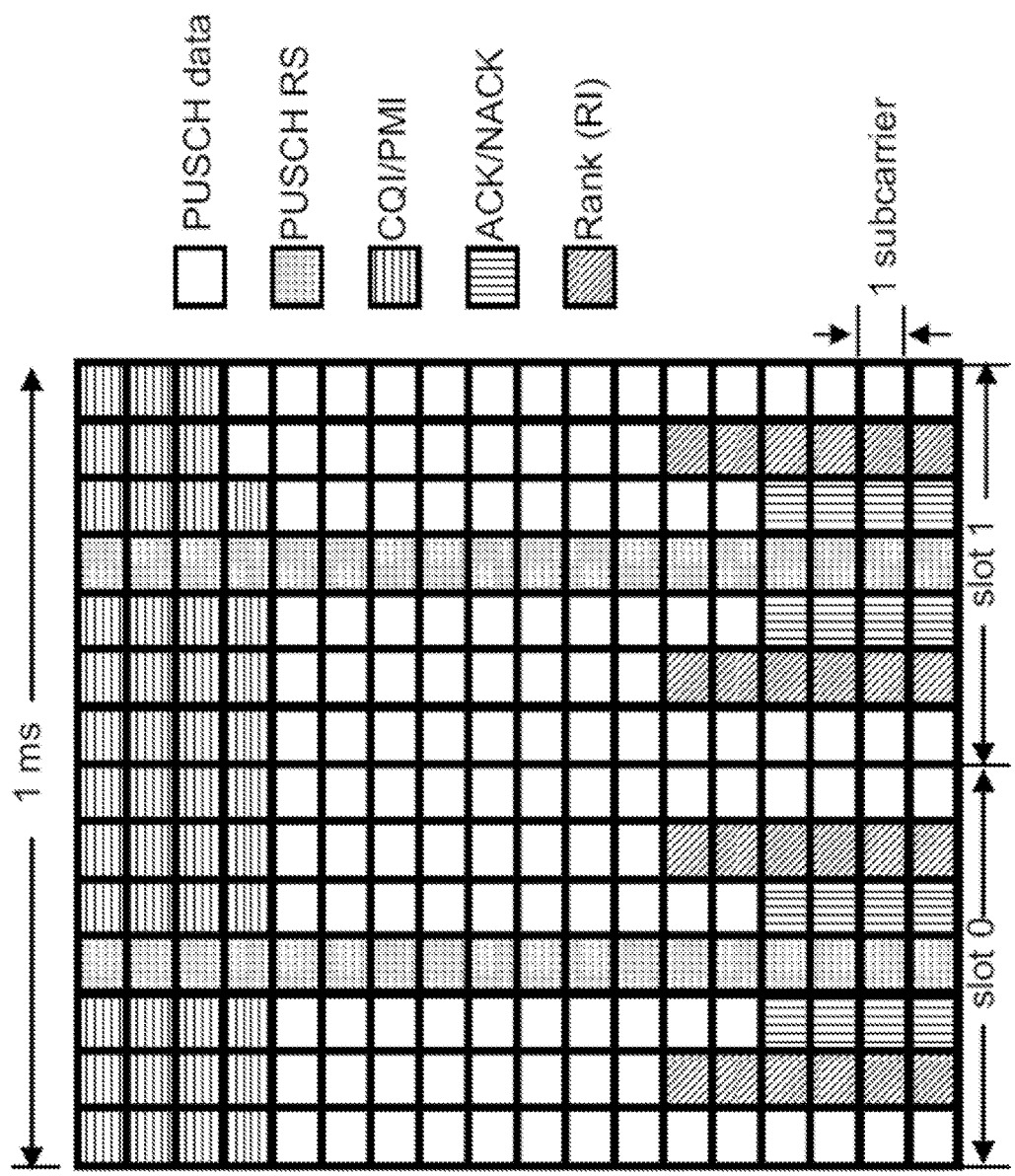
FIG. 2 showing an example of multiplexing of control signaling with UL-SCH data.

FIG. 2 shows an example of multiplexing of control signaling with UL-SCH data.

HARQ ACK/NACK bundling schemes may be considered. Two example types of HARQ ACK/NACK bundling are:

Spatial domain bundling: the HARQ ACK/NACK bits of the two codewords of one subframe of one carrier can be bundled when there is not enough room for HARQ ACK/NACK bits;

Time domain bundling: the HARQ ACK/NACK bits of consecutive subframes of one DL component carrier can be bundled when there is not enough room for HARQ ACK/NACK bits.

Performing spatial bundling may be predetermined to be performed first of those two types. If there is still not enough room for the required HARQ ACK/NACK bits, then time domain bundling may be applied HARQ ACK/NACK bundling as described may be used in particular for the TDD case. For FDD, spatial bundling of HARQ ACK/NACK bits may be used in particular to reserve room for CSI feedback if necessary in some cases.

HARQ ACK/NACK feedback for 32 DLCCs is discussed in the following.

For up to 32 DL CCs of a carrier aggregation, there may be up to 64 HARQ ACK/NACKs to be sent from a terminal at one time (Rank 2 transmission for each CC assumed), depending on the number of configured DL CCs for FDD. For TDD, the number of HARQ-ACK/NACK bits to be fed back/transmitted depends on the number of configured CCs and UL/DL subframe configuration of the DL CCs. Assuming there are 32 DL CCs with UL/DL subframe configuration 2 and transmission mode 3, there are up to 256 (32*4*2) HARQ ACK/NACK bits. Assuming ½ coding rate and QPSK modulation are applied, FDD needs at least 32 REs (Resource Elements), while TDD needs 256 symbols (32 symbols for FDD and 128 symbols for TDD respectively if the bundling is applied between two codewords) at least.

Herein, there are generally described:

E1. A method for operating a terminal in a wireless communication network, the terminal being connected to the network via a communication link having a DL carrier aggregation comprising at least two carriers, the method comprising bundling HARQ feedback for a plurality of carriers of the DL carrier aggregation. The method may generally comprise transmitting, e.g. by a transmitting module of the terminal, the bundled HARQ feedback, e.g. to the network or a network node of the network. It may be considered that the method alternatively or additionally comprises configuring the terminal to perform the bundling (e.g. by a corresponding configuring module of the terminal). Configuring may be based on allocation data received e.g. from a network or network node, e.g. by a receiving module of the terminal. The communication link may comprise one or more UL carrier/s and/or carrier aggregation/s, in particular at least one carrier for transmitting the bundled HARQ feedback.

E2. Method according to E1, wherein bundling is performed based on at least one or a combination of conditions and/or according to one of the methods and embodiments disclosed in this document.

E3. Method according to one of E1 to E2, wherein bundling is performed based on Frequency domain bundling and/or Differentiated bundling for licensed and unlicensed carriers and/or Differentiated bundling for different frequency bands and/or Differentiated bundling for primary carrier and secondary carriers and/or DL CC group specific bundling configuration.

E4. Method according to one of E1 to E4, wherein frequency domain bundling is performed in frequency domain and/or according to the HARQ feedback payload size and/or comprises:

performing HARQ ACK/NACK bundling across a plurality of carriers according to an 'and' rule and/or by determining a compound HARQ ACK/NACK feedback for a plurality of DL carriers by performing an AND operation (e.g. logical AND) on the individual HARQ ACK/NACK feedbacks for the individual carriers; and/or performing frequency domain bundling for a set of CCs, e.g. a predetermined set of CCs, wherein the set may be predetermined and/or configured by the network and/or based on allocation data from the network; and/or performing frequency domain bundling based on a carrier bundling size, which may be received and/or based on allocation data from the network; wherein a carrier bundling size may indicate a number of carriers to be bundled and/or wherein the terminal may determine which carriers and/or HARQ feedback for which carriers to bundle based on a predetermined bundling size; and/or prioritizing across carrier HARQ ACK/NACK bundling lower than then existing time domain bundling and the spatial bundling; and/or performing bundling according to the DL CC index or the DL cell index, in particular such that the bundling across carriers for HARQ ACK/NACK bits of the DL CCs with large DL CC indexes or cell indexes is performed with a higher priority.

E5. Method according to one of E1 to E4, wherein Differentiated bundling for licensed and unlicensed carriers is performed with bundling rules and related configuration for DL CCs of different frequency bands being different and/or comprises:

performing bundling configuring, the HARQ ACK/NACK bundling across carriers for licensed DL CCs and unlicensed DL CCs are either separately or uniformly configured and/or configuring the HARQ ACK/NACK bundling across carriers for licensed DL CCs and unlicensed DL CCs are either separately or uniformly; and/or configuring the bundling size for HARQ ACK/NACK bundling across carriers differently between licensed and unlicensed carriers and/or performing bundling accordingly; the configuring may be performed based on allocation data, which may be received or receivable from a network or network node; and/or configuring the HARQ ACK/NACK bundling priority differently between the licensed and unlicensed DL CCs and/or performing bundling accordingly; in particular, such that HARQ ACK/NACK bundling across unlicensed CCs is performed first and/or prioritized higher than across licensed CCs; and/or performing HARQ ACK/NACK bundling across carriers between adjacent DL CCs.

E6. Method according to one of E1 to E5, wherein differentiated bundling rules for different frequency bands are applied such that differentiated bundling rules are applied for different frequency bands and/or comprises:

configuring the bundling size frequency band specific and/or based on frequency band of the carrier, and/or performing bundling correspondingly; and/or performing the HARQ ACK/NACK bundling across DL CCs to be disabled over one band and enabled over another band and/or configuring the terminal accordingly; and/or configuring the HARQ ACK/NACK bundling priority differently for different frequency bands and/or performing the bundling accordingly.

E7. Method according to one of E1 to E6, wherein differentiated bundling rules for primary carrier and secondary carriers are applied, in particular such that HARQ ACK/NACK feedback for at least on primary and/or control DL CC is prioritized higher than any secondary DL CC and/or comprises:

predefining/configuring that the HARQ ACK/NACK bits from the at least one primary and/or control DL CC shall not be bundled with any other DL CC; and/or predefining/configuring that the HARQ ACK/NACK of some selected secondary DL CCs shall not be bundled with other DL CCs.

E8. Method according to one of the E1 to E7, wherein CC group specific bundling configuration are applied, in particular such that DL CCs are divided into multiple groups, e.g. configured correspondingly, for example by the network, for example in order to reuse some existing signaling and mechanisms, and/or comprises:

applying HARQ ACK/NACK bundling separately for different DL CC groups; and/or configuring the bundling rules and related parameters, e.g. bundling sizes, independently and/or separately for different groups.

E9. Terminal for a wireless or cellular communication network, the terminal being adapted to perform one of the preceding methods, and/or the terminal being adapted to:

perform bundling of HARQ feedback for a plurality of carriers of a DL carrier aggregation. The terminal may be connected and/or connectable to the network, e.g. via a communication link comprising a DL carrier aggregation, which may have at least two carriers. The terminal may be adapted to transmit the bundled HARQ feedback, e.g. to the network or a network node of the network; it may comprise a corresponding transmitting module. It may be considered that the terminal alternatively or additionally is adapted to configure the bundling (e.g. by a corresponding configuring module of the terminal). Configuring may be based on allocation data received e.g. from a network or network node, e.g. by a receiving module of the terminal. The communication link may comprise one or more UL carrier/s and/or carrier aggregation/s, in particular at least one carrier for transmitting the bundled HARQ feedback.

E10. Terminal according to E9, the terminal being adapted to bundling based on at least one or a combination of conditions and/or according to one of the methods and embodiments disclosed in this document.

E11. Terminal according to E9 or E10, the terminal being adapted to perform bundling based on Frequency domain bundling and/or Differentiated bundling for licensed and unlicensed carriers and/or Differentiated bundling for different frequency bands and/or Differentiated bundling for primary carrier and secondary carriers and/or DL CC group specific bundling configuration, in particular according to one of the methods of E4 to E8.

E12. A Method for operating a network node of a wireless or cellular communication network, the method comprising configuring, by the network node, a terminal to perform HARQ ACK/NACK bundling, in particular as described in this document and/or according to one of E1 to E11. The network node may be connected and/or connectable to the terminal, e.g. via a communication link comprising at DL carrier aggregation, which may have at least two carriers. Configuring may comprise obtaining, e.g. by receiving and/or determining, corresponding allocation data, e.g. by a corresponding receiving module or determining module, respectively, of the network node. The allocation data may be received from a network and/or another network node. Configuring the terminal may generally comprise transmitting corresponding allocation data indicating the configuration to be configured to the terminal, e.g. via the communication link and/or by a corresponding transmitting module of the network node. The communication link may comprise one or more UL carrier/s and/or carrier aggregation/s, in particular at least one carrier for transmitting the bundled HARQ feedback. The terminal may generally be any terminal described herein, in particular a terminal according to one of E9 to E11 or E18 to E19.

E13. Method according to E12, wherein the terminal is configured to perform bundling based on at least one or a combination of conditions and/or according to one of the methods and embodiments disclosed in this document.

E14. Method according E12 or E13, wherein the terminal is configured to perform bundling based on Frequency domain bundling and/or Differentiated bundling for licensed and unlicensed carriers and/or Differentiated bundling for different frequency bands and/or Differentiated bundling for primary carrier and secondary carriers and/or DL CC group specific bundling configuration, in particular according to one of E4 to E8.

E15. A Network node for a wireless or cellular communication network, the network node being adapted to perform any of the methods according to any of the E12 to E14 and/or to configure a terminal to perform HARQ ACK/NACK bundling, in particular as described in this document and/or according to one of E1 to E11.

The network node may be connected and/or connectable to the terminal, e.g. via a communication link comprising at DL carrier aggregation, which may have at least two carriers. Configuring may comprise obtaining, e.g. by receiving and/or determining, corresponding allocation data, e.g. by a corresponding receiving module or determining module, respectively, of the network node. The allocation data may be received from a network and/or another network node. Configuring the terminal may generally comprise transmitting corresponding allocation data indicating the configuration to be configured to the terminal, e.g. via the communication link and/or by a corresponding transmitting module of the network node. The communication link may comprise one or more UL carrier/s and/or carrier aggregation/s, in particular at least one carrier for transmitting the bundled HARQ feedback. The terminal may generally be any terminal described herein, in particular a terminal according to one of E9 to E11 or E18 to E19.

E16. Network node according to E15, the network node being adapted to configure the terminal to perform bundling based on at least one or a combination of conditions and/or according to one of the methods and embodiments disclosed in this document.

E17. Network node according to one of E15 or E16, the network node being adapted to configure the terminal to perform bundling based on Frequency domain bundling and/or Differentiated bundling for licensed and unlicensed carriers and/or Differentiated bundling for different frequency bands and/or Differentiated bundling for primary carrier and secondary carriers and/or DL CC group specific bundling configuration, in particular according to one of E4 to E8.

E18. A terminal for a wireless or cellular communication network, in particular a terminal according to one of E9 to E11, the terminal comprising a connection module for connection to the network via a communication link having a DL carrier aggregation comprising at least two carriers, the terminal further comprising a bundling module for bundling HARQ feedback for a plurality of carriers of the DL carrier aggregation.

E19. Terminal according to E18, the bundling module being for performing bundling according to one of the methods and/or embodiments disclosed herein and/or according to one of E4 to E8.

E20. A network node for a wireless or cellular communication network, in particular a network node according to one of E15 to E17, the network node comprising a configuring module for configuring a terminal to perform HARQ ACK/NACK bundling, in particular as described in this document and/or according to one of E1 to E11 and/or one of E12 to E17.

E21. A system for a wireless communication network comprising a network node as described herein and/or according to one of E15 to E17 or E20 and/or a terminal as described herein and/or according to one of E9 to E11 or E18 to E19.

E22. A computer program product comprising code elements causing performing of any of the methods described herein and/or according to one of E1 to E8 or E12 to E14 when executed on control circuitry.

E23. A storage medium or carrier medium storing and/or carrying a computer program product according to E22.

The terminal may generally be adapted for carrier aggregation as described. The network node and/or network and/or system may generally be adapted for carrier aggregation as described. The communication link may be set up and/or configured by the network and/or network node.

Considering the high HARQ ACK/NACK feedback load for up to 32 DL component carriers, the bundling schemes may be further improved to further compress the HARQ ACK/NACK bits when there is no enough room to carry all the HARQ ACK/NACK bits. Considering the large number of DL carriers, the different spectrum types (licensed and unlicensed), different spectrum bands may be aggregated, additional methods to improve the HARQ ACK/NACK bundling are described.

HARQ ACK/NACK bundling schemes considering the characteristics for massive carrier aggregation up to 32 DL CCs. The embodiments are categorized according to the following aspects:

Frequency domain bundling
Differentiated bundling for licensed and unlicensed carriers
Differentiated bundling for different frequency bands
Differentiated bundling for primary carrier and secondary carriers
DL CC group specific bundling configuration Generally, the schemes and/or embodiments may be performed by a terminal (which may be adapted accordingly and/or comprise a corresponding bundling module) and/or a network node may be adapted to configure and/or configure and/or comprise a configuring module for configuring a terminal accordingly and/or to perform the configured embodiment or scheme.

Accordingly, the HARQ ACK/NACK feedback can be compressed and optimized.

Below, detailed embodiments are described by way of example only. In general, described embodiments can be either applied separately or in a combination (jointly) depending on the various conditions.

Frequency domain bundling is described in the following.

According to this method, the HARQ ACK/NACK bundling maybe performed in frequency domain according to the HARQ feedback payload size. Some embodiments:

As a first embodiment, the HARQ ACK/NACK bundling can be performed across carriers according to 'and' rule, i.e. for the scheduled DL CCs whose HARQ ACK/NACK bits are to be bundled, one ACK bit is generated only when the HARQ ACK/NACK bits from these DL CCs are ACK, otherwise NACK is derived. For instance, if there is one HARQ ACK/NACK bit for DL Component Carrier (CC) 1 and another HARQ ACK/NACK bit for DL CC 2 and HARQ ACK/NACK bundling is applied across DL CC1 and 2, only when both HARQ ACK bits are ACK, one ACK bit is generated after HARQ ACK/NACK bundling, otherwise one NACK bit is generated.

As a second embodiment, the frequency domain bundling can be configured to be applied for a set of CCs. For instance, the eNB can configure a UE that the HARQ ACK/NACK bits of CC1, CC2, ... CC N shall be bundled;

As a third embodiment, the frequency domain bundling can be configured with a carrier bundling size. For instance, the eNB can configure the UE the carrier bundling size is X and the UE bundles the HARQ ACK/NACK bits from up to X adjacent CCs when necessary;

As a fourth embodiment, the HARQ ACK/NACK bundling across the carriers belonging to different frequency bands may not be allowed considering that the path loss and interference of carriers belonging to different frequency bands can be quite different. The HARQ ACK/NACK bundling across the carriers of different frequency bands can result in system performance loss.

As a fifth embodiment, the across carrier HARQ ACK/NACK bundling can be lower prioritized than then existing time domain bundling and the spatial bundling. In case of lack of HARQ feedback resource, the spatial bundling and timing domain bundling is determined and applied first, if there is still no enough room to carry the remained HARQ ACK/NACK bits, the bundling across carriers is further determined and applied.

As a sixth embodiment, the bundling can be applied according to the DL CC index or the DL cell index. As one example, the bundling across carriers for HARQ ACK/NACK bits of the DL CCs with large DL CC indexes or cell indexes can be performed with a higher priority. Only when the HARQ feedback resource is still not enough to carry the remained bits after HARQ ACK/NACK bundling across DL CCs with high CC indexes or high cell indexes, the HARQ ACK/NACK bundling across the DL CCs with lower CC or cell indexes is further applied.

Differentiated bundling for licensed and unlicensed carriers is described in the following.

The bundling rules and related configuration for DL CCs of different frequency bands can be different. Some embodiments:

As a seventh embodiment, the HARQ ACK/NACK bundling across carriers for licensed DL CCs and unlicensed DL CCs can be either separately configured or uniformed configured. When separate configuration is applied, the HARQ ACK/NACK bundling rules and configurations can be different between licensed DL CCs and unlicensed DL CCs. For instance the bundling across carriers may be configured for unlicensed DL CCs but not configured for licensed DL CCs.

As an eighth embodiment, the bundling size for HARQ ACK/NACK bundling across carriers may be different between licensed and unlicensed carriers. For instance, the bundling size for licensed carriers shall not be larger than that of the unlicensed CCs in order to ensure the performance of licensed carriers.

As a ninth embodiment, the HARQ ACK/NACK bundling priority can be different between the licensed and unlicensed DL CCs. It is desired that the HARQ ACK/NACK bundling across unlicensed CCs shall be performed first. If it is still no enough room for the remaining HARQ ACK/NACK bits, the HARQ ACK/NACK bundling is further applied across the licensed carriers.

As a tenth embodiment, the HARQ ACK/NACK bundling across carriers shall be performed between the adjacent DL CCs. The reason to do that is that due to WiFi may use 20, 40, 80 and 160 MHz channel, there is certain probability that the adjacent carrier experience similar interference from adjacent WiFi node and that the detection error might be correlated of higher priority than non-adjacent DL CCs.

Differentiated bundling rules for different frequency bands are described in the following.

Similarly, differentiated bundling rules can be applied for different frequency bands.

Some related embodiments comprise:

As an eleventh embodiment, the bundling size can be frequency band specific. For DL CCs of frequency band 1, the bundling size can be configured to X1, For DL CCs of frequency band 2, the bundling size can be configured to X2. X1 and X2 can be either same or different;

As a twelfth embodiment, the HARQ ACK/NACK bundling across DL CCs can be disabled over one band and enabled over another band; For instance, it can be predefined that the HARQ ACK/NACK bundling is disabled for DL CCs of Band Y1 while enabled for DL CCs over the DL CCs of Band Y2.

As a thirteenth embodiment, the HARQ ACK/NACK bundling priority can be different for different frequency bands. An order to perform HARQ ACK/NACK bundling for DL CCs of different bands can be either predefined or configured by eNB via either dedicated signal or broadcast message. For instance, it can be predefined or configured that the HARQ ACK/NACK bundling is applied over Band Y1 before the HARQ ACK/NACK bundling is applied over Band Y2 for different types (spatial, time and across carrier bundling) of HARQ ACK/NACK bundling respectively. If HARQ ACK/NACK bundling over Band Y1 is enough for a UE (i.e. HARQ ACK/NACK bits are enough to be carried with available HARQ ACK/NACK feedback resource for the UE), the HARQ ACK/NACK bundling is not applied over Band Y2 for the UE. Otherwise, the HARQ ACK/NACK bundling is further applied over Band Y2 for the UE.

Differentiated bundling rules for primary carrier and secondary carriers are described in the following.

In practice, at least one DL CC shall be able to provide good coverage for good connectivity. Such CC shall be configured as primary DL CC for a UE. Some important signaling and messages (e.g. mobility control message, RRC signaling etc) shall be transmitted at least over the primary CC. With respect to this, it may be meaningful to ensure the HARQ ACK/NACK feedback for the Primary DL CC better than any secondary DL CC.

As a fourteenth embodiment, it may be predefined/configured that the HARQ ACK/NACK bits from the primary DL CC shall not be bundled with any other DL CC. This could be either predefined or configured. That is, it can be predefined that the configured bundling rules and parameters are only applied for secondary DL CCs.

As a fifteenth embodiment, it can be further predefined/configured that the HARQ ACK/NACK of some selected secondary DL CCs shall not be bundled with other DL CCs. It is applicable when the selected secondary DL CCs are configured to take the controllability of some other secondary DL CCs. For instance, for inter-site carrier aggregation, there may be multiple secondary DL CCs belongs to one secondary eNB and within which one DL CC may be selected to control the other DL CCs. In this case, it can be predefined or configured that the HARQ ACK/NACK bits for the selected CC shall not be bundled with the other secondary CCs. CC group specific bundling configuration There is possibility that the DL CCs can be divided into multiple groups in order to reuse some existing signaling and mechanisms. As one example, the 32 DL CCs can be divided into 4 DL CC groups and each DL CC group has 8 DL CCs.

As a sixteenth embodiment, the HARQ ACK/NACK bundling can be separately applied for different DL CC groups. For instance, if one HARQ feedback resource (i.e. one PUCCH format 3 channels) is configured for each DL group, the UE shall determine and process HARQ ACK/NACK bundling for each DL CC group separately.

Examples of this embodiment comprise: For a first DL CC group with few scheduled DL CCs and the HARQ ACK/NACK feedback resource is enough to carry all the HARQ ACK/NACK bits without any type of bundling, no HARQ ACK bundling is applied. For second DL CC group with many scheduled DL CCs and there is no enough room over the HARQ ACK/NACK feedback resources to carry all the HARQ ACK/NACK bits, HARQ ACK/NACK bundling is applied according to the predefined priority descending order (i.e. spatial bundling first, time domain bundling second and the across carrier bundling last) until the remained HARQ ACK/NACK bits can be filled into the available HARQ ACK/NACK feedback resource.

As a seventeenth embodiment, the bundling rules and related parameters can be independently configured. As one example instance, the across carrier bundling can be disabled for one DL CC group while enabled for another DL CC group. As one another example, the bundling sizes can be different for different DL CC groups.

The different bundling schemes can be applied based on the number of HARQ-ACK bits that is configured per carrier (e.g., one or two). Below follow some examples specifically for TDD and FDD:

FDD CA generates two HARQ-ACK bits per carrier (no bundling)
  5 carriers yield 10 HARQ-ACK bits
  8 carriers yield 16 HARQ-ACK bits
  10 carriers yield 20 HARQ-ACK bits
  Above 10 carriers there are to many bits
  First approach is to apply spatial bundling within the carrier
  Can be done on specific carriers only or on all carriers
  Example below is for all carriers
  10 carriers yield 10 HARQ-ACK bits (spatially bundled)
  20 carriers yield 20 HARQ-ACK bits (spatially bundled)

Above 20 carriers there will be a new problem, i.e. to many bits
  Apply frequency domain bundling or multiple PUCCHs for this scenario
  Bundling in frequency domain are done in specific groups that are preconfigured by RRC
    Need to define enough many groups, e.g. 8 groups are maybe okay and then each group should be able to contain a specific number of carriers
    The bundling groups could have an ID as well, so bundling starts from a specific group order if not all carriers needs to be bundled
  Bundling is done in pairs of two or more based on serving cell index order The same approach can also be applied with maximum of 10 HARQ-ACK bits but then the bundling needs to be applied for lower amount of bits than the above example. Below follows a similar example for TDD
    Exclude conf #5 for now
    Conf #1, i.e. 4 DL subframes maps to single UL subframe
    2 carriers yield 16 HARQ-ACK bits (without spatial bundling)
    5 carriers yield 20 HARQ-ACK bits (with spatial bundling)
    Above 5 carriers there will be an issue, start to apply time domain bundling (similar to FDD)
    20 carriers yield 20 HARQ-ACK bits
    Above 20 carrier frequency domain bundling in addition is applied (similar to FDD above)
    Frequency domain bundling
      Construct a certain number of groups similar to FDD above 20 carrier, but need for many CCs per group, i.e. something like 8 carrier or similar)

There may be considered a network node adapted for performing any one of the methods for operating a network node described herein and/or for configuring a terminal as described herein.

There may be considered a terminal adapted for performing any one of the methods for operating a terminal described herein and/or for performing bundling as described herein, in particular according to a configuration configured by a network or network node or system.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a storage medium or carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

The first cell may generally be a cell of a licensed cellular network, e.g. LTE. It may be a PCell (primary cell, which may be associated to a primary carrier) and/or a cell intended to carry control and command information (which may be associated to a control carrier), in particular for the PCell and/or the second cell, for example a LA SCell (which may be associated to an unlicensed secondary carrier).

An uplink carrier may generally be or indicate a carrier and/or frequency band intended and/or used for uplink transmissions.

A downlink carrier may generally be or indicate a carrier and/or frequency band intended and/or used for downlink transmissions.

A terminal being configured with a cell and/or carrier may be in a state in which it may communicate (transmit and/or receive data) using the cell or carrier, e.g. being registered with the network for communication and/or being synchronized to the cell and/or carrier.

Generally, a node being connected or connectable to a terminal with and/or via a cell or carrier may be adapted for communicating and/or communicate with the terminal using this cell or carrier and/or comprise a corresponding communication link. A terminal being connected or connectable to a network with a cell or carrier may be adapted for communicating and/or communicate with the terminal using this cell or carrier. Connection to a network may refer to connection to at least one node of the network.

Data may refer to any kind of data, in particular any one of and/or any combination of control data or user data or payload data. Control data may refer to data controlling and/or scheduling and/or pertaining to the process of data transmission and/or the network or terminal operation.

Receiving or transmitting on a cell or carrier may refer to receiving or transmitting utilizing a frequency (band) or spectrum associated to the cell or carrier.

A wireless communication network may comprise at least one network node, in particular a network node as described herein. A terminal connected or communicating with a network may be considered to be connected or communicating with at least one network node, in particular any one of the network nodes described herein.

Figure 3:
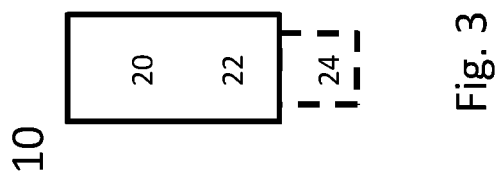
FIG. 3 schematically showing a terminal.

FIG. 3 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry. Modules of a terminal as described herein may be implemented in software and/or hardware and/or firmware in corresponding circuitry.

Figure 4:
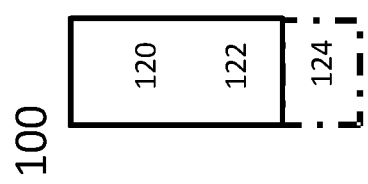
FIG. 4 schematically show a network node.

FIG. 4 schematically show a network node or base station 100, which in particular may be an eNodeB. Network node 100 comprises control circuitry 120, which may comprise a controller connected to a memory. A receiving module and/or transmitting module and/or control or processing module and/or scheduling module and/or CIS receiving module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. Modules of a network node as described herein may be implemented in software and/or hardware and/or firmware in corresponding circuitry.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies.

Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or base station and/or relay node and/or any device generally adapted for communication in a wireless communication network, in particular cellular communication.

A cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

A base station may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA.

Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, e.g. according to an LTE standard. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for cellular communication between two nodes or terminals of a wireless communication network, in particular two user equipments.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands. A network node, e.g. a base station or eNodeB, may be adapted to provide and/or define and/or control one or more cells, e.g. a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g. around 5 GHz.

Configuring a terminal or wireless device or node may involve instructing and/or causing the wireless device or node to change its configuration, e.g. at least one setting and/or register entry and/or operational mode. A terminal or wireless device or node may be adapted to configure itself, e.g. according to information or data in a memory of the terminal or wireless device. Configuring a node or terminal or wireless device by another device or node or a network may refer to and/or comprise transmitting information and/or data and/or instructions to the wireless device or node by the other device or node or the network, e.g. allocation data and/or scheduling data and/or scheduling grants.

A wireless communication network may comprise a radio access network (RAN), which may be adapted to perform according to one or more standards, in particular LTE, and/or radio access technologies (RAT).

A network device or node and/or a wireless device may be or comprise a software/program arrangement arranged to be executable by a hardware device, e.g. control circuitry, and/or storable in a memory, which may provide the described functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation or network node, may be adapted to determine and/or transmit corresponding allocation data indicating release or de-allocation of resources to one or more wireless devices, in particular to a first wireless device.

Allocation data may be considered to be data indicating and/or granting resources allocated by the controlling or allocation node, in particular data identifying or indicating which resources are reserved or allocated for communication for a wireless device and/or which resources a wireless device may use for communication and/or data indicating a resource grant or release. A grant or resource or scheduling grant may be considered to be one example of allocation data. Allocation data may in particular comprise information and/or instruction regarding a configuration and/or for configuring a terminal, e.g. for HARQ bundling and/or which HARQ bundling method to perform and/or how to perform HARQ bundling. Such information may comprise e.g. information about which carriers (and/or respective HARQ feedback) to bundle, bundle size, method to bundle (e.g. which operations to perform, e.g. logical operations), etc., in particular information pertaining to and/or indicating the embodiments and methods described herein. It may be considered that an allocation node or network node is adapted to transmit allocation data directly to a node or wireless device and/or indirectly, e.g. via a relay node and/or another node or base station. Allocation data may comprise control data and/or be part of or form a message, in particular according to a pre-defined format, for example a DCI format, which may be defined in a standard, e.g. LTE. Allocation data may comprise configuration data, which may comprise instruction to configure and/or set a user equipment for a specific operation mode, e.g. in regards to the use of receiver and/or transmitter and/or transceiver and/or use of transmission (e.g. TM) and/or reception mode, and/or may comprise scheduling data, e.g. granting resources and/or indicating resources to be used for transmission and/or reception. A scheduling assignment may be considered to represent scheduling data and/or be seen as an example of allocation data. A scheduling assignment may in particular refer to and/or indicate resources to be used for communication or operation.

HARQ ACK/NACK (acknowledge for a correctly received block of data, not acknowledged for a not correctly received block of data) feedback may refer to feedback (e.g. a corresponding signal transmitted, which may comprise 1 or more bits) provided (e.g. on the UL) by a terminal, e.g. to a network or network node in response to data transmitted to it (e.g. on the DL). HARQ ACK//NACK feedback (or shorter HARQ feedback or just HARQ) may include transmitting a signal/bot indicating whether a transport block of data received by the terminal has been receiver correctly or not. HARQ and/or determining HARQ may include decoding and/or error detection procedures to determine correct reception. There may be defined a number of HARQ processes with associated HARQ ids or numbers, which may refer to individual data streams; a HARQ response or feedback from a terminal (e.g. a HARQ bit) may be associated to one of the HARQ processes or ids. In some variant, HARQ feedback may comprise one bit per DL carrier; in other variant, HARQ feedback may comprise two (or more than two) bits per carrier.

HARQ ACK/NACK bundling or HARQ bundling and/or bundling may generally refer to bundling and/or putting together HARQ feedback pertaining to a set of carriers, e.g. into a common feedback format and/or based on conditions and/or one or more operations, e.g. logical operations and/or selections and/or sorting operations, performed on the HARQ feedback for the carriers, in particular individual carriers, of the set and/or the carriers. HARQ bundling may comprise compressing HARQ feedback regarding a plurality of carriers and/or prioritizing HARQ feedback for some carriers or type of carriers above others and/or dropping some HARQ feedback (e.g., choosing and/or selecting one or more carriers for which no HARQ feedback is provided), and/or selecting and/or choosing one or more carriers for which HARQ feedback is only provided with lower priority and/or delayed. HARQ feedback may be provided on one or more UL channel/s and/or carrier/s and/or carrier aggregations; there may be one or more dedicated channel/s and/or carrier/s the feedback is provided and/or to be transmitted on, e.g. a corresponding control channel and/or primary carrier. In particular, (bundled) HARQ feedback pertaining to a plurality of carriers may be provided on one carrier as a form of bundling. Individual HARQ feedback may comprise one or more HARQ bits associated to one HARQ process and/or HARQ process number. Bundles HARQ feedback may comprise a plurality of individual HARQ feedbacks. HARQ feedback pertaining to a carrier may pertain and/or be associated to a HARQ process and/or HARQ process number associated to that carrier; HARQ feedback pertaining to a plurality of carriers may comprise individual HARQ feedbacks pertaining to different carriers, in particular such that to each carrier of the plurality of carriers there is associated at least one HARQ process/process number and/or at least one individual HARQ feedback. Bundled HARQ feedback may be comprised in one message and/or one data block (e.g., with a common header and/or preamble). Bundled HARQ feedback may comprise one or more HARQ bits per carrier and/or HARQ process bundled.

A bundling size may generally indicate a number of carriers of the carrier aggregation, in particular the number to be bundled and/or on which one or more operations pertaining to bundling are to be performed on.

Adjacent component carriers may be carriers adjacent in numbering (e.g. according to a configuration and/or a standard definition, e.g. LTE) and/or frequency, in particular regarding a frequency distribution as defined by a given standard like LTE.

In the following, some useful abbreviations are described.

| Abbreviation | Explanation |
| --- | --- |
| CCA | Clear Channel Assessment |
| DCI | Downlink Control Information |
| DL | Downlink |
| DMRS | Demodulation Reference Signals |
| eNB | evolved NodeB, base station |
| TTI | Transmission-Time Interval |
| UE | User Equipment |
| UL | Uplink |
| LA | Licensed Assisted |
| LA | Licensed Assisted Access |
| DRS | Discovery Reference Signal |
| SCell | Secondary Cell |
| SRS | Sounding Reference Signal |
| LBT | Listen-before-talk |
| PCFICH | Physical Control Format Indicator Channel |
| PDCCH | Physical Downlink Control Channel |

| Abbreviation | Explanation |
| --- | --- |
| PUSCH | Physical Uplink Shared Channel |
| PUCCH | Physical Uplink Control Channel |
| RRM | Radio Resource Management |
| CIS | Transmission Confirmation Signal |
| 3GPP | 3$^{rd}$ Generation Partnership Project |
| Ack/Nack | Acknowledgment/Non-Acknowledgement, also A/N |
| AP | Access point |
| B1, B2, . . . Bn | Bandwidth of signals, in particular carrier bandwidth Bn assigned to corresponding carrier or frequency f1, f2, . . . , fn |
| BER/BLER | Bit Error Rate, BLock Error Rate; |
| BS | Base Station |
| CA | Carrier Aggregation |
| CoMP | Coordinated Multiple Point Transmission and Reception |
| CQI | Channel Quality Information |
| CRS | Cell-specific Reference Signal |
| CSI | Channel State Information |
| CSI-RS | CSI reference signal |
| D2D | Device-to-device |
| DL | Downlink |
| DL | Downlink; generally referring to transmission of data to a node/into a direction further away from network core (physically and/or logically); in particular from a base station or eNodeB terminal; more generally, may refer to transmissions received by a terminal or node (e.g. in a D2D environment); often uses specified spectrum/bandwidth different from UL (e.g. LTE) |
| eNB | evolved NodeB; a form of base station, also called eNodeB |
| EPDCCH | Enhanced Physical DL Control CHannel |
| E-UTRA/N | Evolved UMTS Terrestrial Radio Access/Network, an example of a RAT |
| f1, f2, f3, . . . , fn | carriers/carrier frequencies; different numbers may indicate that the referenced carriers/frequencies are different |
| f1_UL, . . . , fn_UL | Carrier for Uplink/in Uplink frequency or band |
| f1_DL, . . . , fn_DL | Carrier for Downlink/in Downlink frequency or band |
| FDD | Frequency Division Duplexing |
| ID | Identity |
| L1 | Layer 1 |
| L2 | Layer 2 |
| HARQ | Hybrid Automatic Repeat reQuest |
| LTE | Long Term Evolution, a telecommunications standard |
| MAC | Medium Access Control |
| MBSFN | Multiple Broadcast Single Frequency Network |
| MCS | Modulation and Coding Scheme |
| MDT | Minimisation of Drive Test |
| NW | Network |
| OFDM | Orthogonal Frequency Division Multiplexing |
| O&M | Operational and Maintenance |
| OSS | Operational Support Systems |
| PC | Power Control |
| PDCCH | Physical DL Control CHannel |
| PH | Power Headroom |
| PHR | Power Headroom Report |
| PMI | Precoding Matrix Indicator |
| PRB | Physical Resource Block |
| PSS | Primary Synchronization Signal |
| PUSCH | Physical Uplink Shared CHannel |
| R1, R2, . . . , Rn | Resources, in particular time-frequency resources, in particular assigned to corresponding carrier f1, f2, . . . , fn |
| RA | Random Access |
| RACH | Random Access CHannel |
| RAT | Radio Access Technology |
| RE | Resource Element |
| RB | Resource Block |
| RI | Rank Indicator |
| RRC | Radio Resource Control |
| RRH | Remote radio head |
| RRM | Radio Resource Management |
| RRU | Remote radio unit |
| RSRQ | Reference signal received quality |
| RSRP | Reference signal received power |
| RSSI | Received signal strength indicator |
| RX | reception/receiver, reception-related |
| SA | Scheduling Assignment |
| SINR/SNR | Signal-to-Noise-and-Interference Ratio; Signal-to-Noise Ratio |
| SFN | Single Frequency Network |
| SON | Self Organizing Network |
| SR | Scheduling Request |
| SSS | Secondary Synchronization Signal |
| TPC | Transmit Power Control |
| TX | transmission/transmitter, transmission-related |
| TDD | Time Division Duplexing |
| UE | User Equipment |
| UL | Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency; generally, UL may refer to transmission by a terminal (e.g. to a network or network node or another terminal, for example in a D2D context). |

These and other abbreviations may be used according to LTE standard definitions.

The invention claimed is:

1. A method for operating a terminal in a wireless communication network, the terminal being connected to the network via a communication link having a downlink (DL) carrier aggregation comprising at least two carriers, the method comprising:
bundling Hybrid Automatic Repeat reQuest (HARQ) feedback for a plurality of carriers of the DL carrier aggregation, wherein an acknowledgement (ACK) is generated only when HARQ acknowledgement/non-acknowledgement (ACK/NACK) bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs.

2. The method of claim 1, wherein the bundling is performed based on one or more of frequency domain bundling and differentiated bundling for licensed and unlicensed carriers and differentiated bundling for different frequency bands and differentiated bundling for primary carrier and secondary carriers and DL component carriers (CC) group specific bundling configuration.

3. The method of claim 1, wherein a frequency domain bundling is performed in the frequency domain and according to the HARQ feedback payload size and comprises:
performing HARQ ACK/NACK bundling across a plurality of carriers according to an 'and' rule or by determining a compound HARQ ACK/NACK feedback for a plurality of DL carriers by performing an AND operation on the individual HARQ ACK/NACK feedbacks for the individual carriers;

performing frequency domain bundling for a set of component carriers (CCs), wherein the set may be predetermined or configured by the network and based on allocation data from the network;

performing frequency domain bundling based on a carrier bundling size received and based on allocation data from the network; wherein the carrier bundling size indicates a number of carriers to be bundled and wherein the terminal determines which carriers or HARQ feedback for which carriers to bundle based on a predetermined bundling size; and prioritizing across carrier HARQ ACK/NACK bundling lower than then existing time domain bundling and the spatial bundling; and/or performing bundling according to the DL CC index or the DL cell index, such that the bundling across carriers for HARQ ACK/NACK bits of the DL CCs with large DL CC indexes or cell indexes is performed with a higher priority.

4. The method of claim 1, wherein a differentiated bundling for licensed and unlicensed carriers is performed with bundling rules and related configuration for DL component carriers (CCs) of different frequency bands being different and comprises one or more of:

performing bundling configuring, the HARQ ACK/NACK bundling across carriers for licensed DL CCs and unlicensed DL CCs are either separately or uniformly configured and configuring the HARQ ACK/NACK bundling across carriers for licensed DL CCs and unlicensed DL CCs are either separately or uniformly;

configuring the bundling size for HARQ ACK/NACK bundling across carriers differently between licensed and unlicensed carriers and performing bundling accordingly; the configuring may be performed based on allocation data, which may be received or receivable from a network or network node;

configuring the HARQ ACK/NACK bundling priority differently between the licensed and unlicensed DL CCs and performing bundling accordingly; in particular, such that HARQ ACK/NACK bundling across unlicensed CCs is performed first or prioritized higher than across licensed CCs; and performing HARQ ACK/NACK bundling across carriers between adjacent DL CCs.

5. The method of claim 1, wherein one or more differentiated bundling rules for different frequency bands are applied such that differentiated bundling rules are applied for different frequency bands and comprises one or more of:

configuring the bundling size frequency band specific or based on frequency band of the carrier, and performing bundling correspondingly;

performing the HARQ ACK/NACK bundling across DL component carriers (CCs) to be disabled over one band and enabled over another band and configuring the terminal accordingly; and configuring the HARQ ACK/NACK bundling priority differently for different frequency bands and performing the bundling accordingly.

6. The method of claim 1, wherein one or more component carrier (CC) group specific bundling configuration are applied such that DL CCs are divided into multiple groups and comprises:

applying HARQ ACK/NACK bundling separately for different DL CC groups; and configuring the bundling rules and related parameters independently or separately for different groups.

7. A terminal for a wireless communication network, the terminal being connected to the network via a communication link having a downlink (DL) carrier aggregation comprising at least two carriers, the terminal comprising:

processing circuitry; and memory containing instructions executable by the processing circuitry whereby the terminal is operative to:
bundle Hybrid Automatic Repeat reQuest (HARQ) feedback for a plurality of carriers of the DL carrier aggregation, wherein an acknowledgement (ACK) is generated only when HARQ acknowledgement/non-acknowledgement (ACK/NACK) bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs.

8. The terminal of claim 7, wherein the instructions are such that the terminal is operative to perform bundling based on one or more of frequency domain bundling and differentiated bundling for licensed and unlicensed carriers and differentiated bundling for different frequency bands and differentiated bundling for primary carrier and secondary carriers and DL component carrier (CC) group specific bundling configuration.

9. The terminal of claim 7, wherein the terminal comprises:

a connection module for connection to the network via the communication link;

a bundling module for bundling HARQ feedback for a plurality of carriers of the DL carrier aggregation.

10. A method for operating a network node of a wireless communication network, wherein a terminal is connected to the network node via a communication link having a downlink (DL) carrier aggregation comprising at least two carriers, the method comprising configuring, by the network node, the terminal to perform Hybrid Automatic Repeat reQuest (HARQ) acknowledgement/non-acknowledgement (ACK/NACK) bundling so as to bundle HARQ feedback for a plurality of carriers of the DL carrier aggregation, wherein an acknowledgement (ACK) is generated only when HARQ ACK/NACK bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs.

11. The method of claim 10, wherein the terminal is configured to perform bundling based on one or more of frequency domain bundling and differentiated bundling for licensed and unlicensed carriers and differentiated bundling for different frequency bands and differentiated bundling for primary carrier and secondary carriers and DL component carrier (CC) group specific bundling configuration.

12. A network node for a wireless communication network, the network node operable to connect to a terminal via a communication link having a downlink (DL) carrier aggregation comprising at least two carriers, the network node comprising:
processing circuitry; and
memory containing instructions executable by the processing circuitry whereby the network node is operative to:
configure the terminal to perform Hybrid Automatic Repeat reQuest (HARQ) acknowledgement/non-acknowledgement (ACK/NACK) bundling so as to bundle HARQ feedback for a plurality of carriers of the DL carrier aggregation, wherein an acknowledgement (ACK) is generated only when HARQ ACK/NACK bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs.

13. The network node of claim 12, wherein the instructions are such that the terminal is operative to configure the terminal to perform bundling based on one or more of frequency domain bundling and differentiated bundling for licensed and unlicensed carriers and differentiated bundling for different frequency bands and differentiated bundling for primary carrier and secondary carriers and DL component carrier (CC) group specific bundling configuration.

14. A system for a wireless communication, comprising
a network node; and
a terminal connected to the network node via a communication link having a downlink (DL) carrier aggregation comprising at least two carriers
wherein the terminal comprises:
first processing circuitry; and
first memory containing instructions executable by the first processing circuitry whereby the terminal is operative to bundle Hybrid Automatic Repeat reQuest (HARQ) feedback for a plurality of carriers of the DL carrier aggregation, wherein an acknowledgement (ACK) is generated only when HARQ acknowledgement/non-acknowledgement (ACK/NACK) bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs;
wherein the network node comprises:
second processing circuitry; and
second memory containing instructions executable by the second processing circuitry whereby the network node is operative to configure the terminal to perform HARQ ACK/NACK bundling so as to bundle HARQ feedback for a plurality of carriers of the DL carrier aggregation.

15. A non-transitory computer readable recording medium storing a computer program product for controlling operation of a terminal in a wireless communication network, the terminal being connected to the network via a communication link having a downlink (DL) carrier aggregation comprising at least two carriers, the computer program product comprising software instructions which, when run on processing circuitry of the terminal, causes the terminal to:
bundle Hybrid Automatic Repeat reQuest (HARQ) feedback for a plurality of carriers of the DL carrier aggregation, wherein an acknowledgement (ACK) is generated only when HARQ acknowledgement/non-acknowledgement (ACK/NACK) bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs.

16. A non-transitory computer readable recording medium storing a computer program product for controlling a network node of a wireless communication network, wherein a terminal is connected to the network node via a communication link having a downlink (DL) carrier aggregation comprising at least two carriers, the computer program product comprising software instructions which, when run on processing circuitry of the network node, causes the network node to:
configure the terminal to perform Hybrid Automatic Repeat reQuest (HARQ) acknowledgement/non-acknowledgement (ACK/NACK) bundling so as to bundle HARQ feedback for a plurality of carriers of the DL carrier aggregation, wherein an acknowledgement (ACK) is generated only when HARQ ACK/NACK bits from the plurality of carriers are ACK, wherein one or more differentiated bundling rules for primary carrier and secondary carriers are applied such that HARQ ACK/NACK feedback for at least one primary or control DL component carrier (CC) is prioritized higher than any secondary DL CC and comprises predefining/configuring that the HARQ ACK/NACK bits from the at least one primary or control DL CC shall not be bundled with any other DL CC and that the HARQ ACK/NACK of some selected secondary DL CCs shall not be bundled with other DL CCs.

* * * * *